United States Patent [19]

Szanto et al.

[11] Patent Number: 4,570,351

[45] Date of Patent: Feb. 18, 1986

[54] BOOK CORE GAUGE AND POSITIONING GUIDE FOR CASING BOOK CORES

[75] Inventors: Elmer G. Szanto, Saratogo; Franklin J. Davio, Burbank; Lloyd V. Wallace, Thousand Oaks, all of Calif.

[73] Assignee: Velo-Bind, Inc., Sunnyvale, Calif.

[21] Appl. No.: 643,868

[22] Filed: Aug. 24, 1984

[51] Int. Cl.⁴ .............................................. G01B 5/00
[52] U.S. Cl. .................................................. 33/180 R
[58] Field of Search ............. 33/174 R, 174 G, 180 R

[56] References Cited

U.S. PATENT DOCUMENTS

| | | | |
|---|---|---|---|
| 1,460,348 | 6/1923 | Nelson | 33/180 R |
| 3,057,073 | 10/1962 | Swartz | 33/180 R |
| 4,369,582 | 1/1983 | Pfeffer | 33/180 R |
| 4,503,618 | 3/1985 | Eberhardt | 33/180 R |

Primary Examiner—Richard R. Stearns
Attorney, Agent, or Firm—Julian Caplan

[57] ABSTRACT

Cases (covers) for binding books are made in a series of sizes which differ from each other in the width of the spine and each size accommodates a range of book cores. The gauge of the present invention indicates which size case is proper and further measures the precise thickness of the core. Simultaneously, the gauge moves an edge guide of a positioning guide so that the core is located accurately centered relative to the spine area of the case and the case is also located relative to the guide.

9 Claims, 13 Drawing Figures

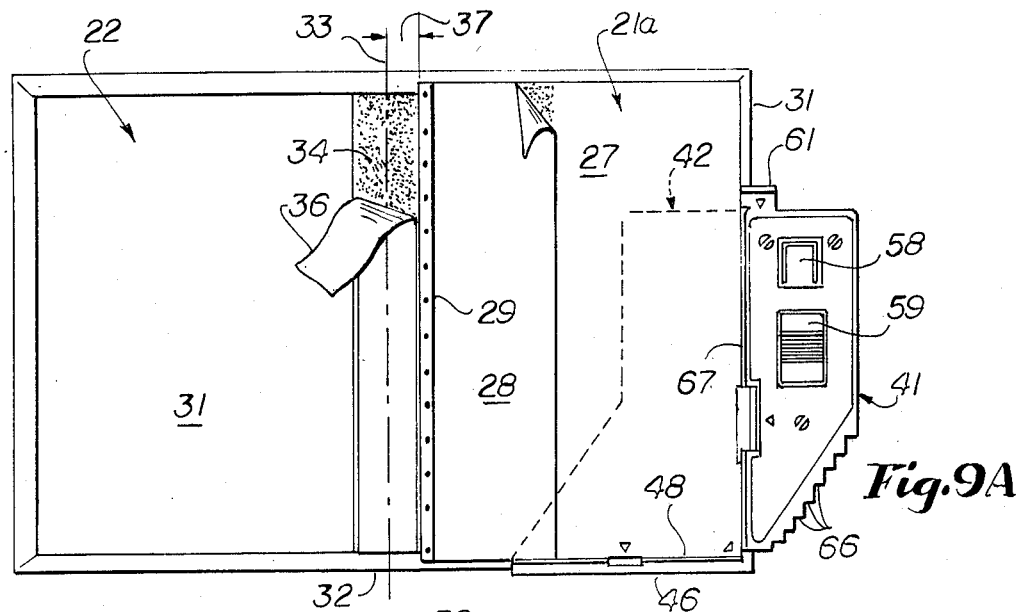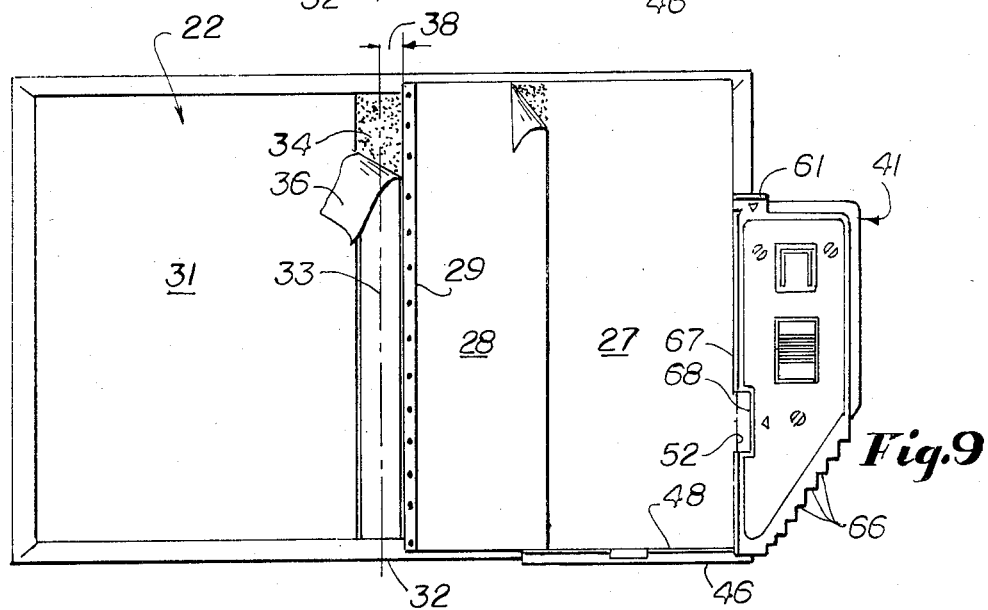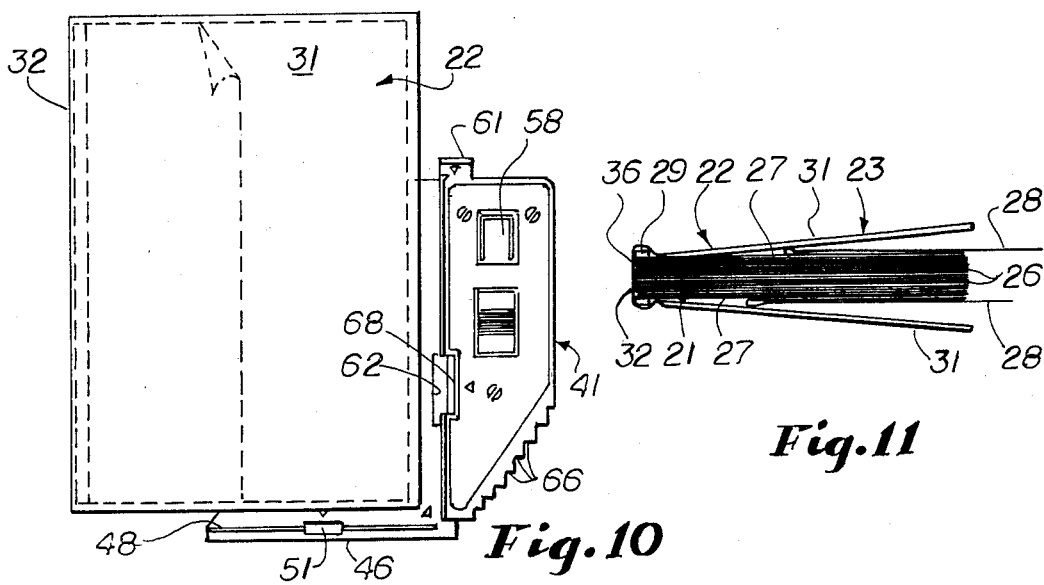

BOOK CORE GAUGE AND POSITIONING GUIDE FOR CASING BOOK CORES

This invention relates to a new and improved tool used in desk top book making. It is used first to determine the size of the case (book cover) which should be used to encase a book core of particular spine thickness and then to position edge guides so that the core is properly centered relative to the spine portion of the case.

In commercial bookbinding, the apparatus for casing books is elaborate and expensive. Heretofore, the assignee of this application has developed two different devices for centering the core relative to the case as set forth in U.S. Pat. Nos. 3,912,304 and 3,825,964. The present invention constitutes an improvement over the latter patents in that it is simpler in structure and easier to use.

A preferred book core with which the present device may be used is designated as reference numeral 56 in FIG. 6 of U.S. Pat. No. 3,964,770. In this preferred embodiment, there are book pages which vary greatly in number from instance to instance of use. The number of sheets in the core creates the problem which is solved by use of the present invention—namely, that a thicker book requires a case having a wider spine area than a thinner book and, for a particular range of sizes which use one particular case size, for aesthetic reasons, the spine of the core must be accurately centered relative to the spine of the case. In addition to the book sheets, in the preferred embodiment there are optionally end sheets such as those shown in U.S. Pat. No. 3,749,422 at the front and back of the core and binding means binding the end sheets and the pages together. A preferred binding means is made of plastic strips such as those shown in U.S. Pat. No. 4,369,013. It will be understood, however, that the use of end leaves and the use of plastic binding strips is optional since the present invention can be used with a core of any type.

A preferred case, or hard cover, is shown in FIG. 5 of U.S. Pat. No. 3,964,770. Thus the preferred case has a flexible spine area between two hard covers. In the middle of the spine area is a foam plastic pad coated with pressure sensitive adhesive and initially protected by release paper. The release paper is removed and the spine of the core adheres to the pad of the case. Thus is produced a cased book such as that shown in FIG. 1A of U.S. Pat. No. 3,749,423. As has been mentioned, it is important that, for aesthetic reasons, the core be centered relative to the spine area of the case. Unless it is so centered, the margin between the outer edge of the core and the outer edges of the top cover will be different than the margin between the outer edge of the core and the outer edge of the bottom cover of the completed book. Although a preferred case has been mentioned herein and is hereinafter described in considerable detail, nevertheless it will be understood that the present invention may be used with cases of other construction.

The device which is the subject of this invention is intended for use by relatively unskilled operators in an office environment, as contrasted with commercial book manufacturing equipment which is cumbersome, expensive, occupying large areas of a factory floor and requiring highly skilled operators to set up the machine and supervise its operation.

Another feature of the present device is that it is quickly adjusted for different sizes of book. Conventional book casing equipment is usually set up for a particular book of particular dimensions. Shifting from one size to another requires time and skill.

Accordingly, the present invention is easy to use and produces accurate centering of the core relative to the case with little operational experience and skill.

The device is a small tool which requires very little storage space. It is inexpensive to manufacture and requires no maintenance.

The device of the present invention is used first of all to select the proper size case, i.e., to measure the thickness of the spine of the core and thereby determine the proper size case spine width.

The device, in addition to assisting in selection of the case size, also accurately measures the thickness of the spine of the core and simultaneously moves a side edge guide for the core. The edge of the core is placed against the side edge guide and this locates the core symmetrically relative to the spine of the case. Another edge guide locates the core symmetrically relative to the top and bottom edges of the case.

Other objects of the present invention will become apparent upon reading the following specification and referring to the accompanying drawings in which similar characters of reference represent corresponding parts in each of the several views.

Figure 1:
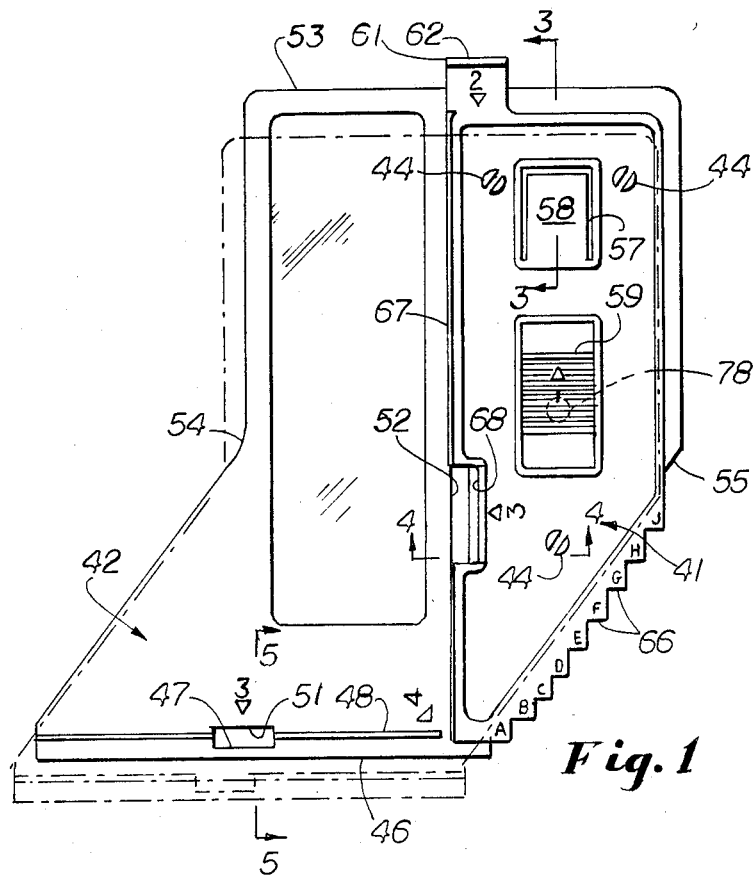
FIG. 1 is a front elevational view of the device showing the device in two positions of use.
Figure 2:
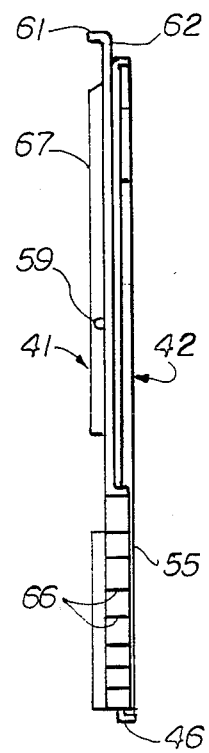
FIG. 2 is a side elevational view of the structure of FIG. 1.
Figure 3:
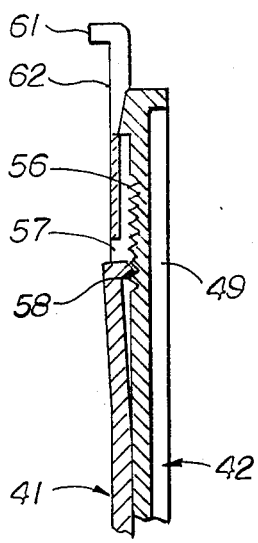
Figure 4:
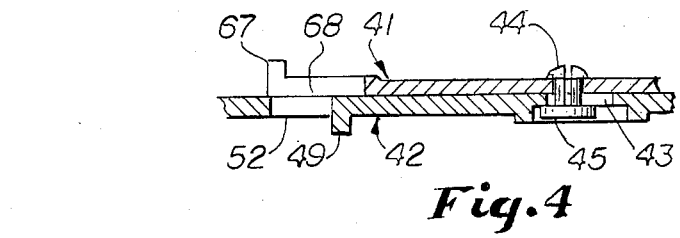
Figure 5:
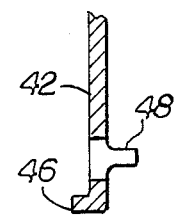

FIGS. 3, 4 and 5 are enlarged fragmentary sectional views taken substantially along the lines 3—3, 4—4 and 5—5 of FIG. 1, respectively.

Figures 6, 6A:
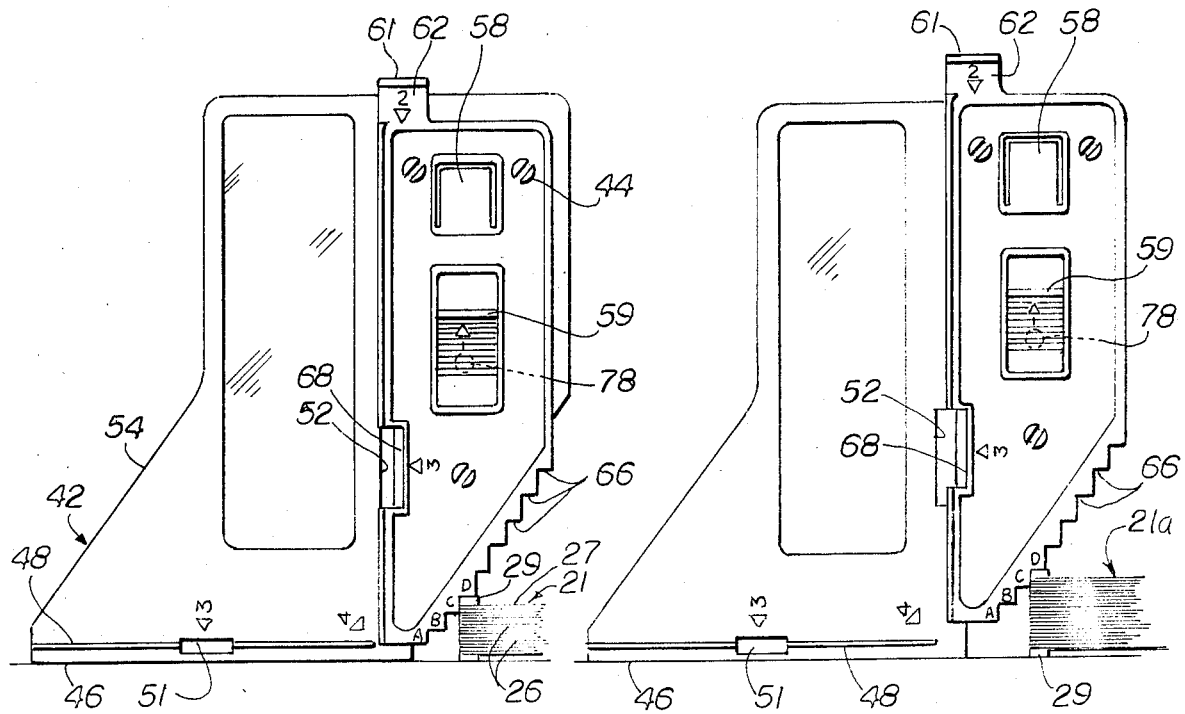

FIG. 6 is a front elevational view (in reduced scale) showing the device of the present invention being used to gauge the the thickness of a particular core.

FIG. 6A is a view similar to FIG. 6 showing the device used to gauge the thickness of a core which is thicker than that of FIG. 6.

Figure 7:
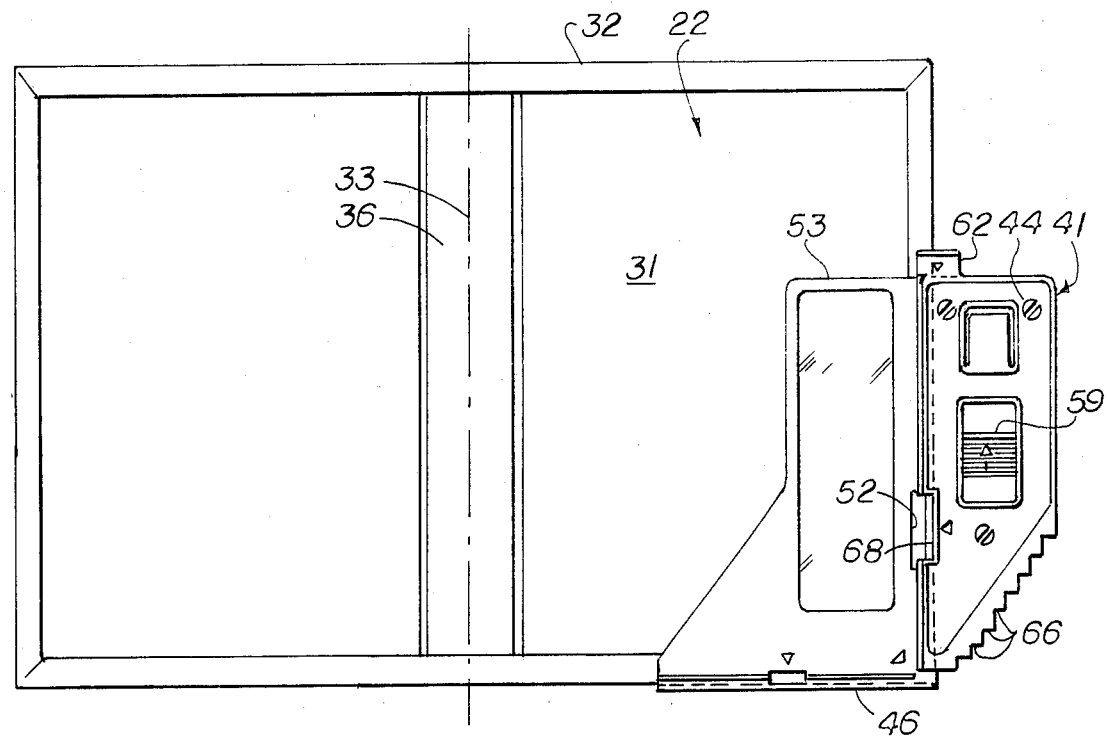

FIG. 7 is a front elevational view showing the device in place used as a guide for positioning a case.

Figure 8:
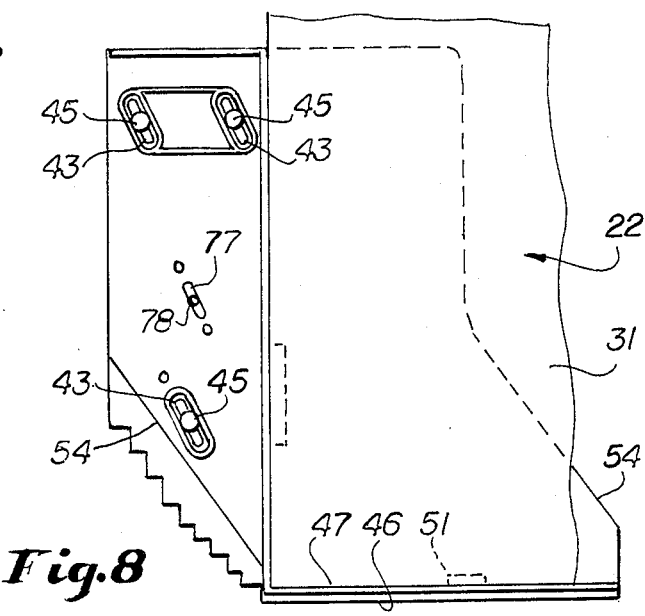

FIG. 8 is a rear elevational view of a portion of the structure of FIG. 7.

FIG. 9 is a front elevational view showing the device used to position a case and also the core which has been gauged in FIG. 6.

FIG. 9A is a view similar to FIG. 9 showing the device positioning the core of FIG. 6A.

FIG. 10 shows the device partially withdrawn from the assembled book after it has been used to position the spine of the core centered relative to the spine of the case.

FIG. 11 is an end elevational view of a completed book showing the release paper for the end leaves in the process of being stripped from the end leaves.

The present invention is used in assembling a core 21 and a case 22 to produce a cased book 23. Core 21 consists of a plurality of sheets 26, the number of such sheets varying from book to book. In a preferred embodiment, end leaves 27 such as shown in U.S. Pat. No. 3,749,422 are positioned on the top and the bottom of a stack of sheets 26, having pressure-sensitive adhesive on the outer faces thereof initially protected by release paper 28. Binding means 29 such as shown in U.S. Pat. No. 4,369,013 binds together the two end leaves 27 and the sheets 26.

Case 22 such as shown in U.S. Pat. No. 3,964,770 has front and back covers 31, separated by a flexible spine area 32 which has a hypothetical center line 33. Covering most of the spine area 32 is a pad 34 of a resilient foam material having pressure-sensitive adhesive on its upper face initially protected by release paper 36. The purpose of the present invention is to assist in selecting a particular case 22 having a spine area 32 of proper width and then to position the core 21 so that the center line of the core is accurately located relative to the center line 33. In commercial practice, cases 22 are designated as sizes "A", "B", etc., depending on the width of spine area 32. The details of construction of core 21 and cases 22 which are described and illustrated herein are subject to considerable variation.

The tool which is the subject of this invention consists of a slidable portion 41 and a base 42. The slidable portion 41 partially overlaps the right hand end of the base 42, as illustrated herein. Formed in base 42 are slots 43 which slant downwardly and to the left at an angle of about 67°, this angle being subject to variation. Studs 44 fixed to slidable portion 41 fit through the slots 43 and are formed with heads 45 to retain the two parts in assembled, but relatively slidable, position. Pin 78 on slidable portion 41 fits into slot 77 in base 42 (which is at the same angle as slots 43) and the length of slot 77 limits the length of movement of the two members 41, 42 relative to each other.

Base 42, on its left-hand side, has a foot 46 which, when the device is used as a gauge, fits flat on a table or other supporting surface. On the back of base 42 at about the level of foot 46 is a bottom stop 47 for the case and on the front of base 42 is a bottom stop 48 for the core. Stop 48 is farther from foot 46 than stop 47. Extending at right angles to the stops 47 and 48 on the back of the base 42 is side stop 49 for the case. To help the user determine whether the device is accurately in place on a case, bottom window 51 is formed approximately midway of the length of bottom stop 48, the stop 48 being suitably interrupted for such window 51. Similarly, a side window 52 is formed immediately to the left of side stop 49. The left side of base 42 is cut away as indicated by reference numeral 54 and the lower right corner 55 of base 42 is cut away at about 45°.

Formed on the upper surface of the portion of base 42 which is overlapped by the slidable portion 41 is a ratchet 56, or toothed surface. An inverted U-shaped slot 57 is formed in the slidable portion 41 overlying ratchet 56 and a pawl 58 is formed just below the top of the slot 57. Pawl 58 fits into the teeth of ratchet 56 and because of the slot 57 the pawl 58 is flexible relative thereto. A finger grip 59 is formed on the exterior of slidable portion 41 to facilitate sliding movement of portion 41 relative to base 42. Additionally, a forwardly bent tab 61 is formed on the upward extension 62 of the top edge of slidable portion 42, further to facilitate movement of the two parts relative to each other.

The lower right-hand corner of slidable portion 41 is formed in a series of steps 66 which are preferably designated with indicia such as capital letters which are used for particular spine widths of cases 22.

On the front of slidable portion 41 extending vertically along the length thereof is a side stop 67 for the core. Overlying said stop 49 is a side window 68 formed in the slidable portion 41.

In use, the operator first lifts the slidable portion 41 upward and to the right relative to base 42 to the limit of its movement, sliding being facilitated by reason of the flexibility of the pawl 58 located within the U-shaped slot 57. Turning now to FIGS. 6 and 6A, with the slidable portion 41 fully up, the foot 46 is placed on a table and a core 21 or 21a placed adjacent thereto. The user then brings the steps 66 into proximity to the spine of the core 21 and determines the lowest step 66 into which the core 21 fits. By reading the particular designator ("A", "B", etc.) the proper case 21 size (i.e., spine width) may be selected. In the relationships shown in FIGS. 6 and 6A, although the cores 21 and 21a differ in thickness, both are accommodated by a "D-size" case.

The next step in use of the device is for the operator to push downward on the tab 61 until the "D-size" step 66 fits securely against the top of the core 21. Because the core 21 of FIG. 6 is thinner than the core 21a of FIG. 6A, this means that the slidable portion 41 has moved downwardly and, more importantly, to the left relative to the position which it can move in FIG. 6A. In other words, the side stop 67 for the core is farther to the left in FIG. 6 than it is in FIG. 6A. The pawl 58 fitting into one of the teeth of the ratchet 56 holds the parts 41 and 42 against unintentional relative movement until the completion of the casing operation.

The next step in the operation is illustrated in FIGS. 7 and 8. The device is placed over the proper case 22 and the bottom guide 46 is placed in close contact with the bottom edge of the right-hand cover 31 while the right-hand edge of the right cover 31 is placed in close contact with the side guide 49. That the case 22 is in proper relationship to the base 42 is observed through the windows 51 and the aligned windows 68 and 52.

The release paper 28 is preferably removed at this time, which exposes the pressure sensitive adhesive on the pad 34.

The next step in the operation is shown in FIGS. 9 and 9A. The bottom edge of the core 21 is placed tight against the stop 48 on the front of the base 42 and the side edge of the core 21 is placed tight against the side guide 67 on the slidable portion 41 and the opposite side edge edge of the core 21 along the binding means edge is placed onto the adhesive surface of pad 34, which assists in retaining the core 21 in its proper position. It will be observed from FIG. 9 that the right edge of cover 31 extends to the right of the right edge of the core 21. In FIG. 9A, since the core 21a is thicker than the core 21 of FIG. 9, the guide 67 is positioned to the right of its postion in FIG. 9. The purpose of the different postions of the stop 67 in the two figures is accurately to locate the center line of the spine of the core 21 relative to the center line 33.

As shown in FIG. 9A, since core 21a is thicker than core 21 (shown in FIG. 9), the distance 37 from centerline 33 is greater than the distance 38 from the edge of the core.

Thereupon, the left cover 31 is brought upward and to the right until it encloses the core 21. This brings the adhesive on the pad 34 into intimate contact with the spine of the core 21 causing the two parts to adhere. Such a relationship is shown in FIG. 10. The final step in the preferred embodiment of the invention is shown in FIG. 11 where the release papers 28 are being pulled away, exposing the pressure-sensitive adhesive on the end leaves 27 which adhere to the insides of the covers 31, forming a completed cased book. The use of the present invention insures that spine area 32 properly fits the thickness of core 21 and also that the outer edges of covers 31 extend the same distance beyond the outer edge of core 21—i.e., the core 21 is symmetric relative to case 22.

What is claimed is:

1. A device of the character described comprising a base member having a bottom edge, a slidable member on a first side of said device partially overlapping said base member, means for guiding said slidable member for movement at an acute angle relative to said bottom edge, a book case bottom stop on said base member on the second side of said device, a book case side stop on said second side perpendicular to said bottom edge, a book core bottom stop on said first side parallel to and spaced away from said book case bottom stop, and a book core side stop on said slidable member on said first side parallel to said book case side stop.

2. A device according to claim 1 in which said means for guiding comprises at least two slots disposed at said acute angle in one said member and studs extending from the other said member through said slots.

3. A device according to claim 1 which further comprises a ratchet on one said member and a pawl positioned to engage said ratchet on the other said member whereby said members may be restrained in relative position until said pawl is disengaged from said ratchet.

4. A device according to claim 1 in which said base member is formed with a first window adjacent a portion of said book case bottom stop, said base member is formed with a second window adjacent said book case side stop, and said slidable member is formed with a third window at least partially overlapping said second window.

5. A device according to claim 1 in which said slidable member is formed with finger grip means to assist the user in sliding said slidable member relative to said base member.

6. A device according to claim 1 in which said base member is formed with a marginal foot parallel to said book case bottom stop.

7. A device according to claim 6 in which said slidable member has an edge formed with a plurality of steps having top edges substantially parallel to said foot, whereby book core width may be measured by placing said core and said foot on the same flat support surface and then moving said device toward said core until said core fits under the top edge of one of said steps.

8. A device according to claim 7 in which said means is disposed for movement of said slidable member at an angle of about 67°.

9. A device according to claim 7 in which said core side stop moves parallel to and away from said case side stop an increasing distance as said steps move toward the plane of said foot.

* * * * *